(12) United States Patent
Martin (10) Patent No.: US 10,298,169 B2
(45) Date of Patent: May 21, 2019

(54) BONDING CLIP FOR METAL RAIL SPLICES

(71) Applicant: Hubbell Incorporated, Shelton, CT (US)

(72) Inventor: Evan Ronald Martin, Derry, NY (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 15/131,355

(22) Filed: Apr. 18, 2016

(65) Prior Publication Data

US 2017/0302220 A1    Oct. 19, 2017

(51) Int. Cl.
   *F16B 2/24*   (2006.01)
   *H02S 20/22*  (2014.01)
   *F16B 2/00*   (2006.01)

(52) U.S. Cl.
   CPC .............. *H02S 20/22* (2014.12); *F16B 2/005* (2013.01); *F16B 2/245* (2013.01); *Y02B 10/10* (2013.01); *Y10T 24/44915* (2015.01)

(58) Field of Classification Search
   CPC .. F16B 2/24; F16B 2/241; F16B 2/245; F16B 2/005; Y10T 24/44923; Y10T 24/4709; Y10T 24/3924; Y10T 24/307; Y10T 24/304; Y10T 24/306; Y10T 24/44863; Y10T 24/44906; Y10T 24/44769; Y10T 24/44778; Y10T 24/44786; Y10T 24/44855; Y10T 24/44915; H02S 20/22
   USPC .......... 24/562, 289, 293, 294, 295, 457, 458
   See application file for complete search history.

(56) References Cited

U.S. PATENT DOCUMENTS

| | | | |
|---|---|---|---|
| 942,693 A * | 12/1909 | Wintermute | ............ F16B 12/24 16/DIG. 24 |
| 3,020,602 A * | 2/1962 | Siering | ............... E04F 13/0816 411/458 |
| 3,049,042 A * | 8/1962 | De Lynn | ................. F16B 15/04 29/432 |
| 3,208,119 A * | 9/1965 | Seckerson | ................. F16B 5/06 24/295 |
| 3,528,050 A | 9/1970 | Hindenburg | |
| 4,087,149 A | 5/1978 | Fischer | |
| 4,406,505 A | 9/1983 | Avramovich | |
| 4,875,876 A | 10/1989 | O'Loughlin | |
| 5,347,691 A * | 9/1994 | Terazoe | .............. B60R 13/0206 24/289 |
| 5,451,167 A | 9/1995 | Zielinkski et al. | |
| 6,106,310 A | 8/2000 | Davis et al. | |
| 6,186,799 B1 | 2/2001 | Mello | |
| 6,234,835 B1 | 5/2001 | Bakker et al. | |
| 2010/0192334 A1* | 8/2010 | Reichle | .................... B60M 5/02 24/457 |

* cited by examiner

*Primary Examiner* — Abigail E Troy
(74) *Attorney, Agent, or Firm* — Wissing Miller LLP (57) ABSTRACT

Bonding clip used to electrically bond metal rails forming frameworks are provided. The bonding clip includes an electrically conductive back pad having a plurality of arms extending from the back pad. Each arm has one or more penetrating projections extending into a receiving zone between the arms. The arms have a lead-in at a free end. The lead-in has one or more penetrating projections extending away from the receiving zone.

14 Claims, 9 Drawing Sheets

BONDING CLIP FOR METAL RAIL SPLICES

BACKGROUND

Field

The present disclosure relates generally to bonding clips, and more particularly to bonding clips used to bond and splice metal rails.

Description of the Related Art

In recent years, the use of photovoltaic arrays to provide electrical power in commercial, residential, and other environments has become popular. Photovoltaic arrays are typically composed of a number of photovoltaic modules set within a metallic frame and a rail system that supports the photovoltaic modules. The rail system is attached to a support structure such as a roof or the ground. When installing a photovoltaic array, a number of photovoltaic modules are assembled onto the rail system. The metallic frames of the individual photovoltaic modules, and the structural pieces, e.g., the rails, on which the modules mount are generally made out of aluminum. Depending upon the size of the photovoltaic array, the rail system may include multiple metallic rails coupled or connected together in a grid pattern. Like other sources of electrical power, to ensure safety, the metal frames of the photovoltaic modules and the metal rails on which they are secured are often required by national or local electrical codes to be electrically bonded.

SUMMARY

The present disclosure provides descriptions of configurations for bonding clips used to electrically bond metal rails forming the framework for photovoltaic arrays. In one exemplary configuration, the bonding clip includes a pair of opposing arms, each arm having one end connected to a back pad and a free end. A receiving zone is formed between the pair of opposing arms. Each arm has at least one arm penetrating projection extending into the receiving zone, and the free end of each arm has a lead-in having at least one lead-in penetrating projection. In an exemplary configuration, the pair of opposing arms and backpad are made of a rigid electrically conductive material, such as metal. Examples of a suitable metal includes steel, stainless steel, galvanized steel, aluminum or an aluminum alloy. In an exemplary configuration, the arm and lead-in penetrating projection comprise a tooth having a pointed end.

In another exemplary configuration the bonding clip includes a first arm having a first end connected to a back pad and a lead-in at a second end, a second arm having a first end connected to a back pad and a lead-in at a second end, and a gap between the first and second arms that permits the bonding clip to straddle a metal structure. The first arm has at least one arm penetrating projection extending into the gap and the first arm lead-in has at least one lead-in penetrating projection extending away from the gap. The second arm has at least one arm penetrating projection extending into the gap and the second arm lead-in has at least one lead-in penetrating projection extending away from the gap.

The present disclosure also describes methods for bonding metal rails. In one exemplary configuration, the method includes attaching a first bonding clip to a first end of a splicer and a second bonding clip to a second end of the splicer. The first end of the splicer is then slid into one end of a first metal rail. The second end of the splicer is then slid into one end of a second metal rail. The first bonding clip includes a pair of opposing arms, each arm having one end connected to a back pad and a free end such that a receiving zone is formed between the pair of opposing arms for attaching the first bonding clip to the first end of the splicer. Each arm has at least one arm penetrating projection extending into the receiving zone and engaging the slider, and the free end of at least one arm has a lead-in having at least one lead-in penetrating projection engaging the first metal rail. The second bonding clip includes a pair of opposing arms, each arm having one end connected to a back pad and a free end such that a receiving zone is formed between the pair of opposing arms for attaching the second bonding clip to the second end of the splicer. Each arm has at least one arm penetrating projection extending into the receiving zone and engaging the slider, and the free end of at least one arm has a lead-in having at least one lead-in penetrating projection engaging the second metal rail.

In another exemplary configuration, the method includes attaching a first bonding clip to a first end of a splicer and a second bonding clip to a second end of the splicer. The first end of the splicer is slid into one end of a first metal rail. The second end of the splicer is slid into one end of a second metal rail. In this exemplary configuration, the first bonding clip includes a first arm having a first end connected to a back pad and a lead-in at a second end, a second arm having a first end connected to a back pad and a lead-in at a second end, and a gap between the first and second arms that permits the bonding clip to straddle the first end of the splicer. The first arm has at least one arm penetrating projection extending into the gap such that the at least one arm penetrating projection engages the splicer, and the first arm lead-in has at least one lead-in penetrating projection extending away from the gap and engaging the first metal rail. The second arm has at least one arm penetrating projection extending into the gap and the second arm lead-in has at least one lead-in penetrating projection extending away from the gap. The second bonding clip includes a first arm having a first end connected to a back pad and a lead-in at a second end, a second arm having a first end connected to a back pad and a lead-in at a second end, and a gap between the first and second arms that permits the bonding clip to straddle the second end of the splicer. The first arm has at least one arm penetrating projection extending into the gap such that the at least one arm penetrating projection engages the splicer, and the first arm lead-in has at least one lead-in penetrating projection extending away from the gap and engaging the second metal rail. The second arm has at least one arm penetrating projection extending into the gap and the second arm lead-in has at least one lead-in penetrating projection extending away from the gap.

BRIEF DESCRIPTION OF THE DRAWINGS

The figures depict configurations for purposes of illustration only. One skilled in the art will readily recognize from the following description that alternative configurations of the structures illustrated herein may be employed without departing from the principles described herein, wherein.

DETAILED DESCRIPTION

The present disclosure provides descriptions of configurations for bonding clips used to electrically bond together metal structure rails, and more specifically to electrically bond together metal rails used as the framework for installing photovoltaic arrays. The bonding clip is formed of a metal, and can have a unitary or multi-part construction. The bonding clip electrically bonds metal structures, e.g., metal rails, by using teeth-like projections that can penetrate non-conductive, protective coatings on the metal structures to contact the metal to permit electrically conductive contact between the metal rails. Generally, electrical bonding, electrical bond, and/or electrically bonding are used herein in the technical sense set forth in National Electric Code, Article 250. Generally, electrical bonding, electrical bond and/or electrically bonded are used here in as forming an electrically conductive path between the metal structures to ensure electrical continuity between the metal structures and an electrical supply source sufficient to establish a ground fault current path to safely conduct electrical current imposed on the metal structures.

Figure 1:
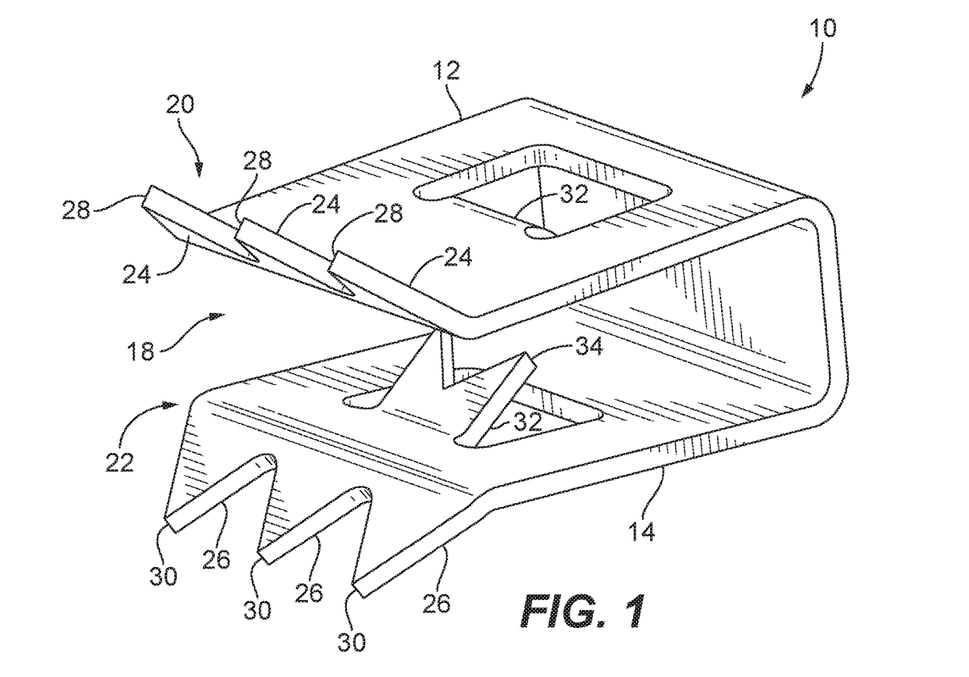
FIG. 1 is a front perspective view of an exemplary configuration of a bonding clip according to the present disclosure.
Figure 2:
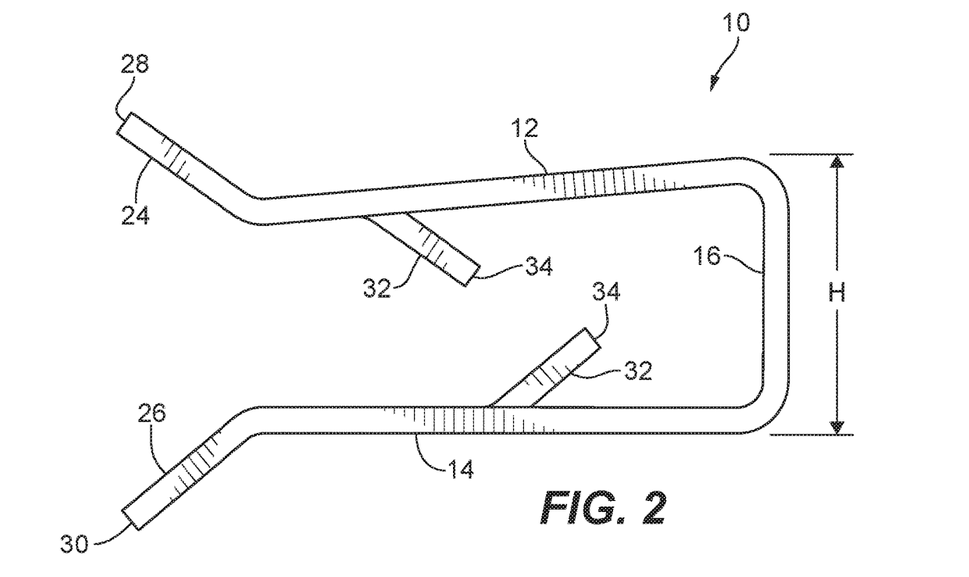
FIG. 2 is a side view of the bonding clip of FIG. 1.
Figure 3:
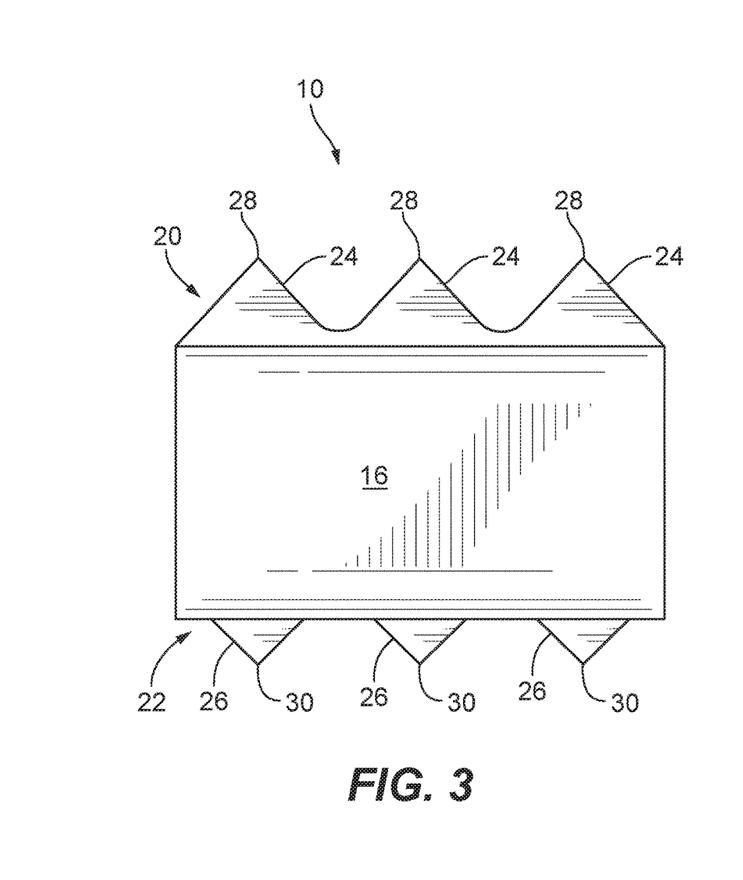
FIG. 3 is a rear elevation view of the bonding clip of FIG. 1.
Figure 4:
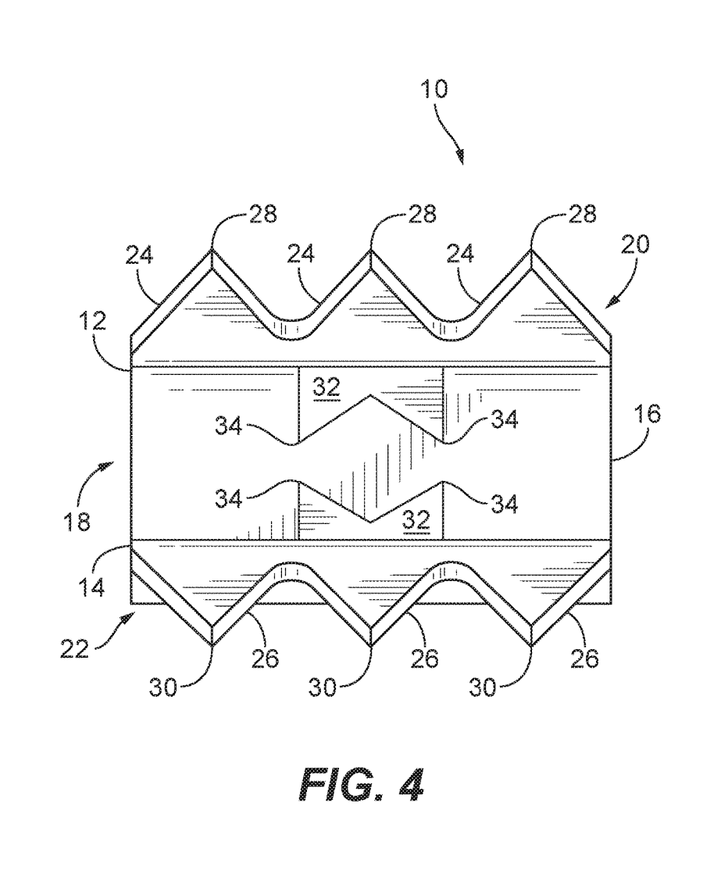
FIG. 4 is a front elevation view of the bonding clip of FIG. 1.

Referring to FIGS. 1-6, an exemplary configuration of a bonding clip according to the present disclosure is shown. In this exemplary configuration, the bonding clip 10 may be of unitary construction, and is formed into a clamp shape having two opposing arms 12 and 14, joined by a back pad 16. The two opposing arms 12 and 14 and back pad 16 define between them a receiving zone 18, e.g., an elongated channel, seen in FIG. 1, for receiving portions of splicers and metal rails forming, for example, the framework for photovoltaic arrays. As shown in FIG. 2, each arm 12 and 14 has a lead-in 20 and 22, respectively, which may be a rounded edge or other lead-in that facilitates a smooth entry of the bonding clip 10 onto the splicer or metal rail. The lead-ins 20 and 22 may include one or more penetrating projections 24 and 26 respectively. As shown in FIGS. 3 and 4, the lead-in penetrating projections may be, for example, teeth, that extend away from the receiving zone 18 so that a pointed end 28 and/or 30 of the penetrating projections 24 and 26, respectively, can pierce through non-conductive coatings, e.g., paint or powder coating, on the metal rails or splicers. Each arm 12 and 14 of the bonding clip 10 also includes one or more inward penetrating projections 32, e.g., teeth, that extend into the receiving zone 18 so that a pointed end 34 of the penetrating projections 32 can pierce through non-conductive coatings, e.g., paint or powder coating, on splicers or metal rails inserted between the arms 12 and 14 to contact the metal of the splicers or metal rails, as seen in FIG. 2. Having one or more lead-in penetrating projections 24 on arm 12, one or more lead-in penetrating projections 26 on arm 14, and one or more arm penetrating projections 32 on each arm 12 and 14 ensures that each side of the bonding clip 10 can engage a splicer or metal rail to facilitate the electrical bonding function of the bonding clip.

Figure 5:
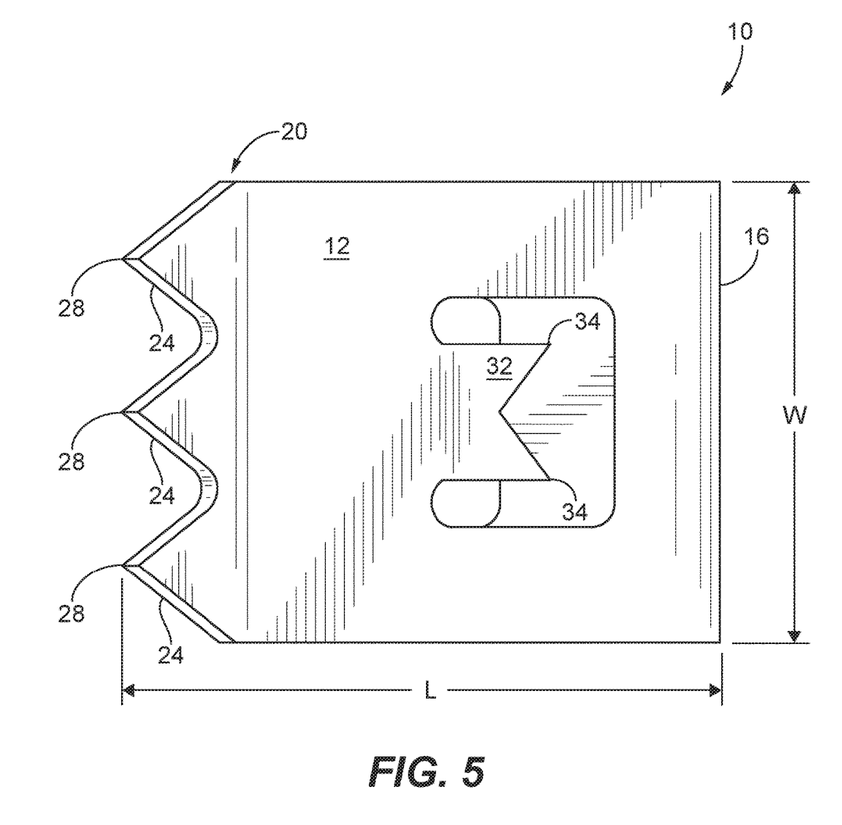
FIG. 5 is a top plan view of the bonding clip of FIG. 1.
Figure 6:
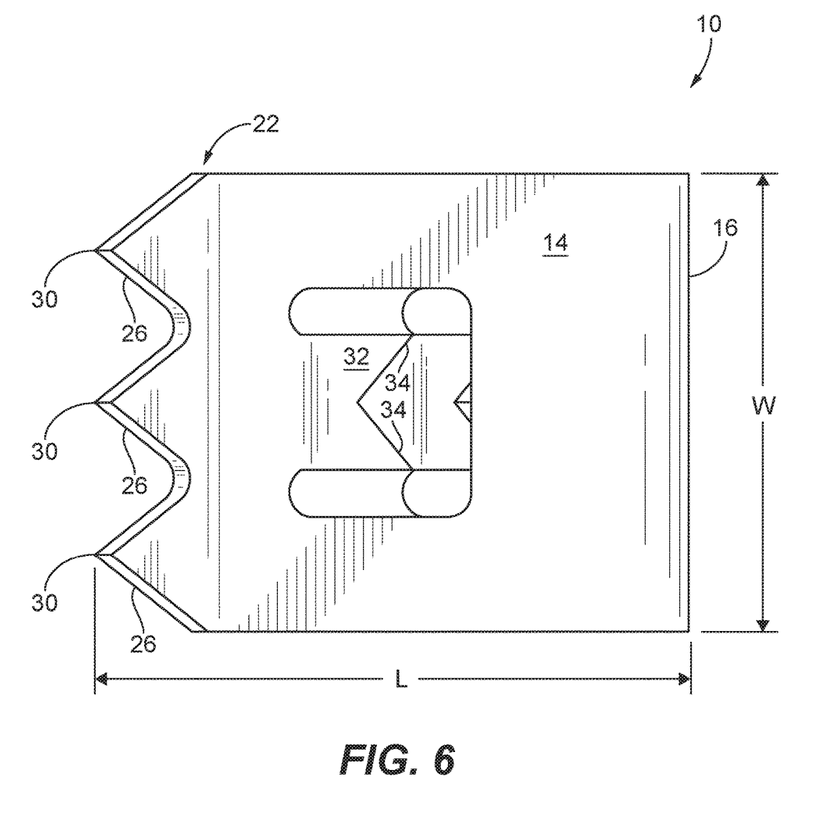
FIG. 6 is a bottom plan view of the bonding clip of FIG. 1.

Referring to FIGS. 5 and 6, the arms 12 and 14 can come in many shapes and sizes having a width "W" and a length "L". An example of the width "W" of the arms can be in the range from about 5 mm to about 20 mm, and an example of the length "L" of the arms can be in the range from about 10 mm to about 30 mm. However, these dimensions are provided as examples and are not to be construed as limiting the dimensions of the bonding clip. The back pad 16 can also come in many shapes and sizes, having for example the same width "W" as the arms 12 and 14, and a height "H" (seen in FIG. 2). The height "H" of the back pad may be in the range from about 5 mm to about 20 mm. However, these dimensions are provided as examples and are not to be construed as limiting the dimensions of the bonding clip.

The bonding clip 10 according to the present disclosure is made of a rigid, electrically conductive material. Examples of such a rigid, electrically conductive material is a conductive metal, such as steel, including stainless steel and galvanized steel, aluminum or an aluminum alloy.

Figure 7:
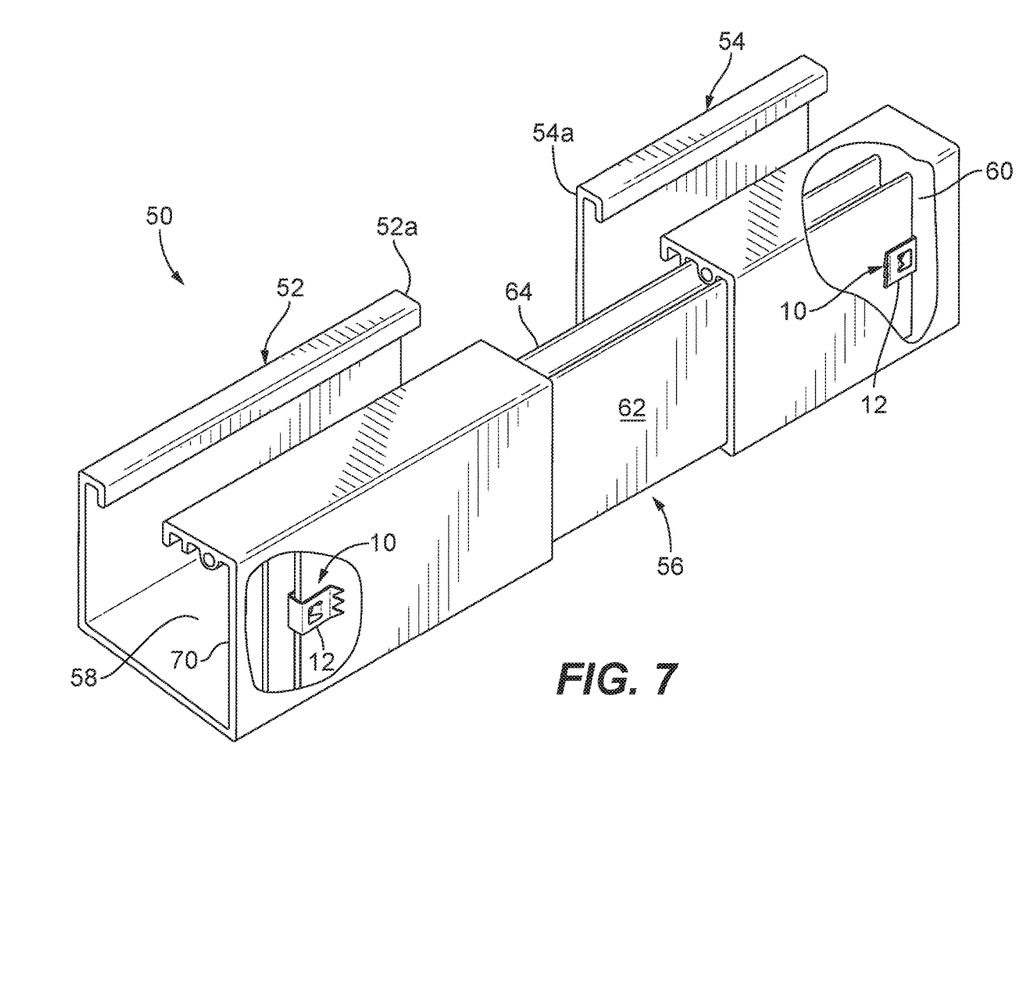
FIG. 7 is a top perspective view of a portion of a rail system where two rails are spliced and bonded using a splicer and the bonding clip of FIG. 1.
Figure 8:
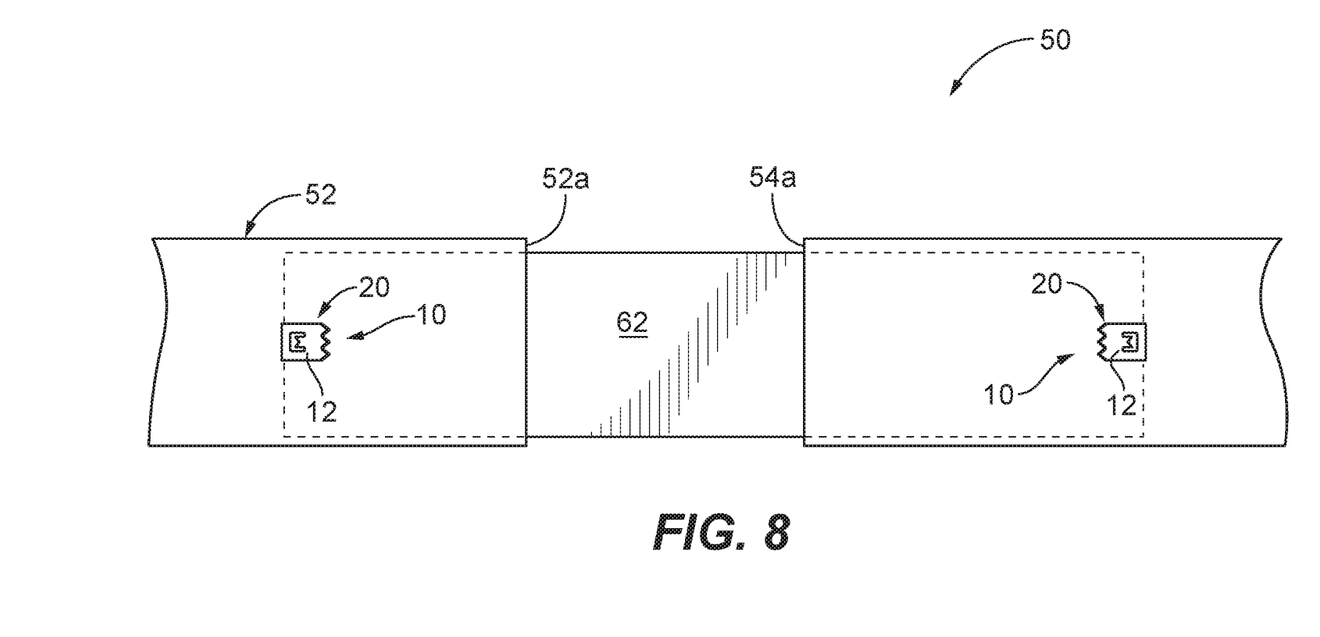
FIG. 8 is a side elevation view of the portion of the rail system of FIG. 7.

Referring to FIGS. 7 and 8, a description of an exemplary rail system for photovoltaic arrays is provided. In this exemplary configuration, the rail system or structure 50 includes a plurality of elongated rails 52 and 54 that typically come in predefine lengths, and are mounted on a support surface, such as a roof or the ground, typically in a grid pattern. The predefined lengths of the elongated rails can come in any size, such as for example, 3 foot and 20 foot lengths. For ease of description, the configuration shown in the drawings has two rails 52 and 54. To couple, connect or join the two elongated rails 52 and 54, a splicer 56 may be used. The splicer 56 is an elongated member typically configured to fit within a splicer channel 58 in rail 52 and/or splicer channel 60 in rail 54. The length of the splicer may be any size, such as for example, in the range of about 6 inches and about 2 feet. The splicer 56 may be secured within the splicer channel 58 using, for example, fasteners or a friction fit to limit movement of the rails 52 and 54 relative to the splicer 56. The splicer 56 is made of a rigid, electrically conductive material. Examples of such a rigid, electrically conductive material is a conductive metal, such as steel, including stainless steel and galvanized steel, aluminum or an aluminum alloy. The splicer 56 couples, connects or joins the ends of the rails 52 and 54 and provides structural integrity to the joint. To better connect the splicer 56 to the rails 52 and 54, and to electrically bond the rails 52 and 54 to each other and to the splicer 54, the bonding clip 10 of the present disclosure is used.

Figure 9:
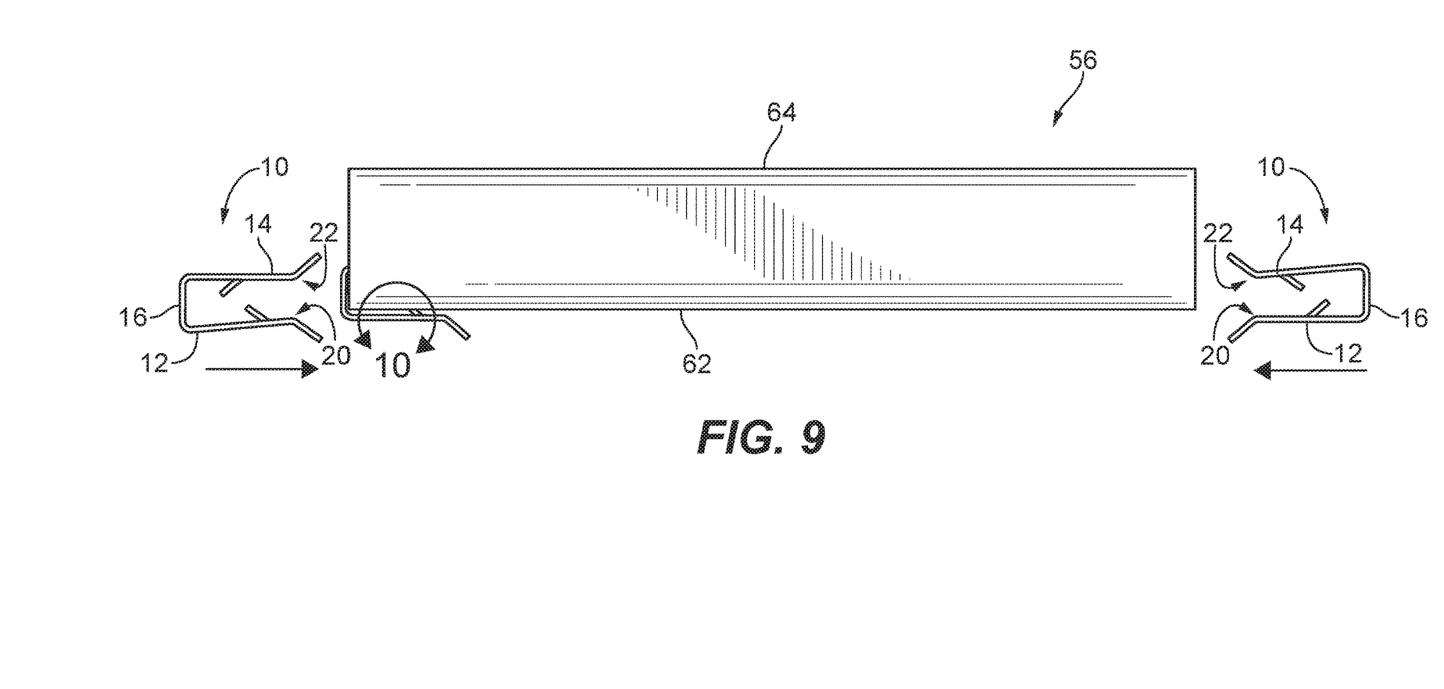
FIG. 9 is a top plan view of a splicer and bonding clip of FIG. 7.
Figure 10:
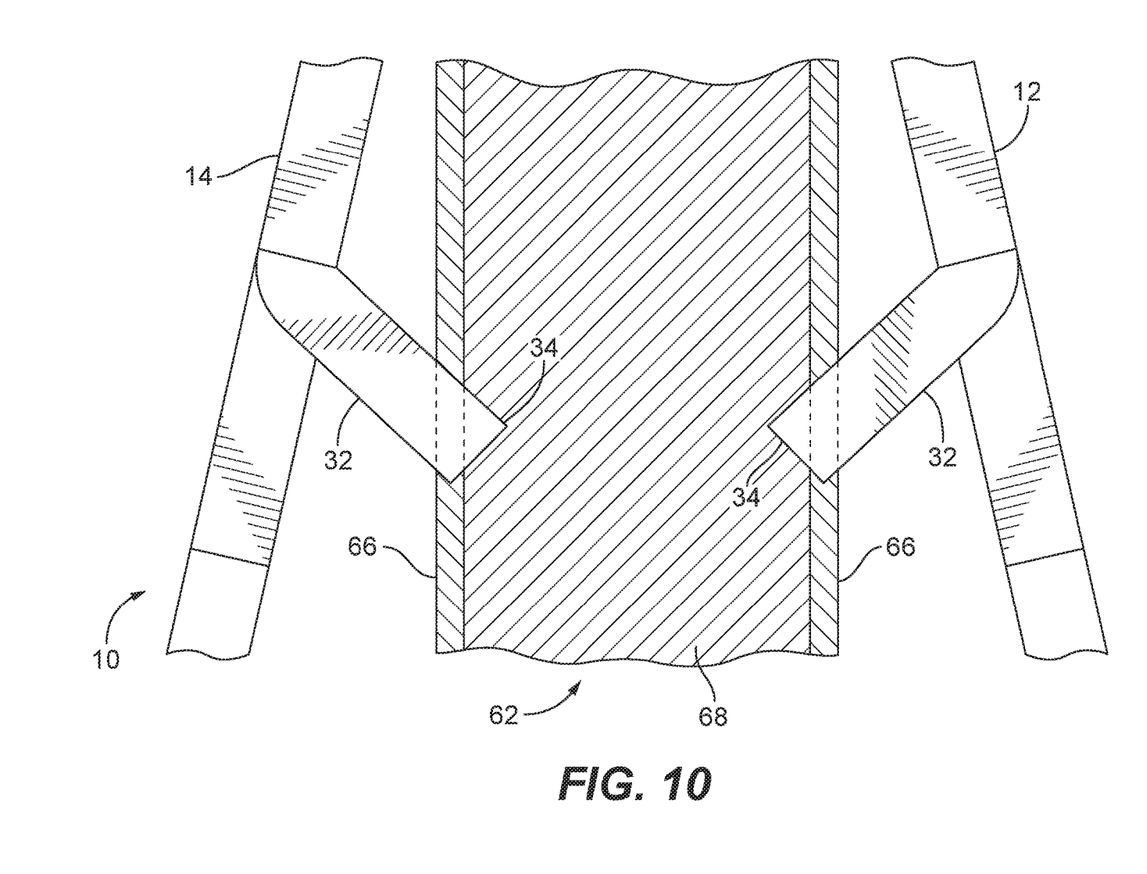
FIG. 10 is an enlarged view of a portion of the splicer and bonding clip of FIG. 9, illustrating penetrating projections piercing through a non-conductive coating on the splicer.

Referring to FIGS. 7-12, in use, the lead-ins 20 and 22 of a bonding clip 10 are slipped onto each end of a splicer 56, as shown in FIGS. 8 and 9. As the lead-ins 20 and 22 are slipped onto each end of the splicer 54, the one or more inward penetrating projections 32 on each arm 12 and 14 engage a side 62 or 64 of the splicer 56 so that the pointed end 34 of each penetrating projection 32 pierces through any non-conductive coatings 66, e.g., paint or powder coating, on an outer surfaces of the sides 62 and 64 of the splicer 56, as shown in FIG. 10. Piercing the non-conductive coating permits the metal of the bonding clip 10 to contact the metal portion 68 of the splicer 56.

Figure 11:
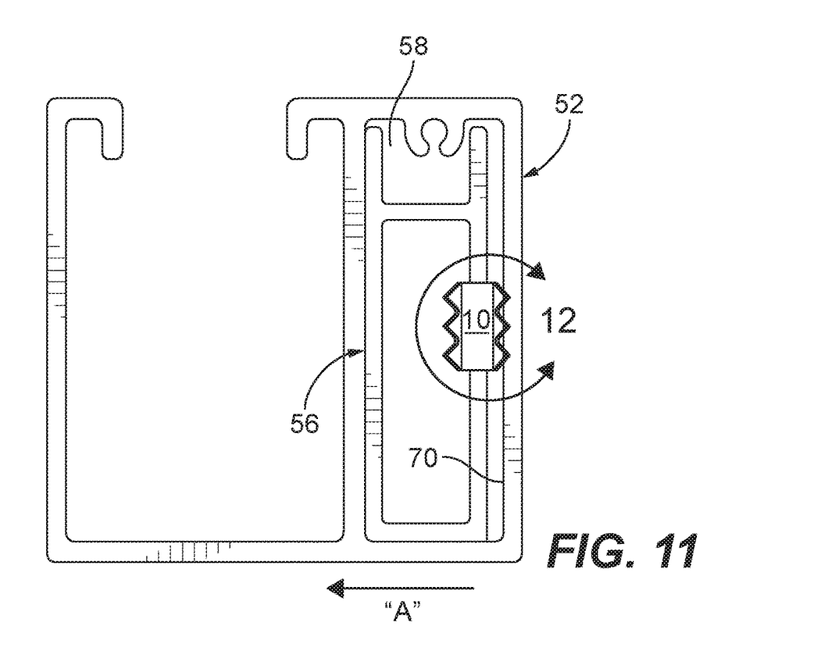
FIG. 11 is an end view of the portion of the spliced rail system of FIG. 7.
Figure 12:
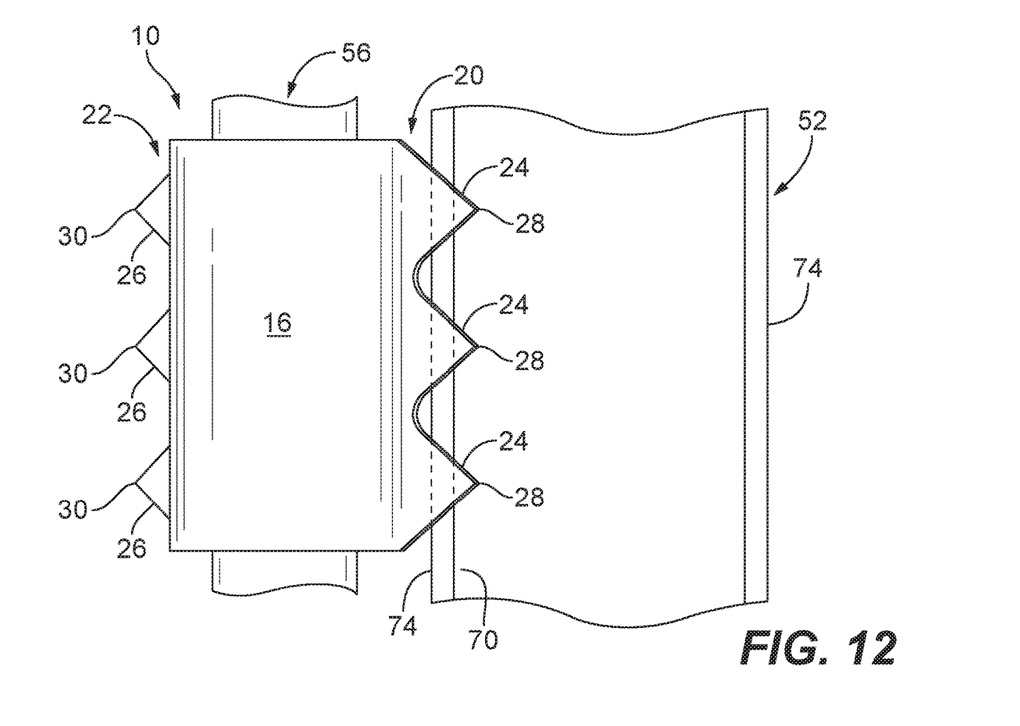
FIG. 12 is an enlarged view of a portion of the spliced rail system of FIG. 11 illustrating a bonding clip secured to the splicer and engaging a rail.

After the bonding clips 10 are secured to the splicer 56, a first end of the splicer having the bonding clip 10 is inserted into splicer channel 58 via, for example, end 52a of the rail 52. Alternatively, the end 52a of the rail 52 may be inserted onto the splicer 56 such that the splicer enters the splicer channel 58. In either case. as the splicer 56 and the bonding clip 10 enter the splicer channel 58, the lead-in penetrating projections on the lead-in, e.g., the lead-in penetrating projections 24 on lead-in 20. engage an inner surface 70 of the rail 52, as seen in FIGS. 11 and 12. As the penetrating projections engage the inner surface 70 the pointed ends 28 of the penetrating projections 24 pierces through any non-conductive coatings 74. e.g., paint or powder coating, on the inner surface of the rail 52. In addition, the penetrating projections 32 on each arm 12 and 14 hold the bonding clip 10 in position on the splicer 56.

Having the penetrating projections 24 engage the inner surface 70 of the rail 52 also causes the splicer 56 to move in the direction of arrow "A" (seen in FIG. 11), creating a friction force between the rail 52 and the splicer 56 further securing the splicer to the rail. Once the splicer 56 is secured within the splicer channel 58, the other rail 54 is attached to the splicer by, for example, inserting the splicer 56 into the splicer channel 60 in rail 54. As the splicer 56 and the bonding clip 10 enter the splicer channel 60, the lead-in penetrating projections on the lead-in, e.g., the lead-in penetrating projections 24 on lead-in 20, engage the inner surface of the rail 54 in a manner similar to the configuration of FIGS. 11 and 12 described above. As the penetrating projections engage the inner surface of the rail the pointed ends 28 of the penetrating projections 24 pierces through any non-conductive coatings, e.g., paint or powder coating, on inner surface of the rail 54. The rails 52 and 54 are then pushed toward each other until end 52a of rail 52 contacts or comes in close contact with end 54a in rail 54.

While illustrative configuration s of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A bonding clip comprising:
    a pair of opposing arms, each arm having a first end and a second end, with the first end being connected to a back pad and the second end being free such that a receiving zone is formed between the pair of opposing arms,
    wherein each arm has at least one arm penetrating projection extending into the receiving zone, wherein the second end of each arm has a lead-in having a plurality of lead-in penetrating projections extending from a front edge of the lead-in, each penetrating projection having a pointed tip, and wherein each lead-in includes a rounded edge that causes the plurality of lead-in penetrating projections to extend from the front edge of the lead-in in a direction away from the receiving zone.

2. The bonding clip according to claim 1, wherein the pair of opposing arms and the back pad are made of a rigid electrically conductive material.

3. The bonding clip according to claim 2, wherein the electrically conductive material comprises a metal.

4. The bonding clip according to claim 3, wherein the metal comprises steel, stainless steel, galvanized steel, aluminum or aluminum alloy.

5. The bonding clip according to claim 1, wherein the at least one arm penetrating projection comprises a tooth having a pointed end.

6. The bonding clip according to claim 1, wherein the at least one arm penetrating projection comprises a plurality of arm penetrating projections.

7. The bonding clip according to claim 6, wherein each of the plurality of arm penetrating projections comprises a tooth having a pointed end.

8. A bonding clip comprising:
    a first arm having a first end connected to a back pad and a lead-in at a second end,
    a second arm having a first end connected to the back pad and a lead-in at a second end; and
    a gap between the first and second arms that permits the bonding clip to straddle a metal structure;
    wherein the first arm has at least one arm penetrating projection extending into the gap and the first arm lead-in has a plurality of lead-in penetrating projections extending from a front edge of the lead-in, each penetrating projection having a pointed tip;
    wherein the second arm has at least one arm penetrating projection extending into the gap and the second arm lead-in has a plurality of lead-in penetrating projections extending from a front edge of the lead-in, each penetrating projection having a pointed tip;
    wherein the first arm lead-in includes a rounded edge that causes the plurality of lead-in penetrating projections of the first arm lead-in to extend from the front edge of the lead-in in a direction away from the gap; and
    wherein the second arm lead-in includes a rounded edge that causes the plurality of lead-in penetrating projections of the second arm lead-in to extend from the front edge of the lead-in in a direction away from the gap.

9. The bonding clip according to claim 8, wherein the first arm, the second arm and the back pad are each made of a rigid electrically conductive material.

10. The bonding clip according to claim 9, wherein the electrically conductive material comprises a metal.

11. The bonding clip according to claim 10, wherein the metal comprises steel, stainless steel, galvanized steel, aluminum or aluminum alloy.

12. The bonding clip according to claim 8, wherein the at least one arm penetrating projection for the first and second arms comprise a tooth having a pointed end.

13. The bonding clip according to claim 8, wherein the at least one arm penetrating projection for the first and second arms comprise a plurality of penetrating projections.

14. The bonding clip according to claim 13, wherein each of the plurality of arm penetrating projections comprises a tooth having a pointed end.

\* \* \* \* \*